June 18, 1968  H. SAWYER, JR., ET AL  3,388,673
ROTATABLE PLATFORM AND DRIVE MECHANISM THEREFOR
Filed Aug. 23, 1965  3 Sheets-Sheet 3
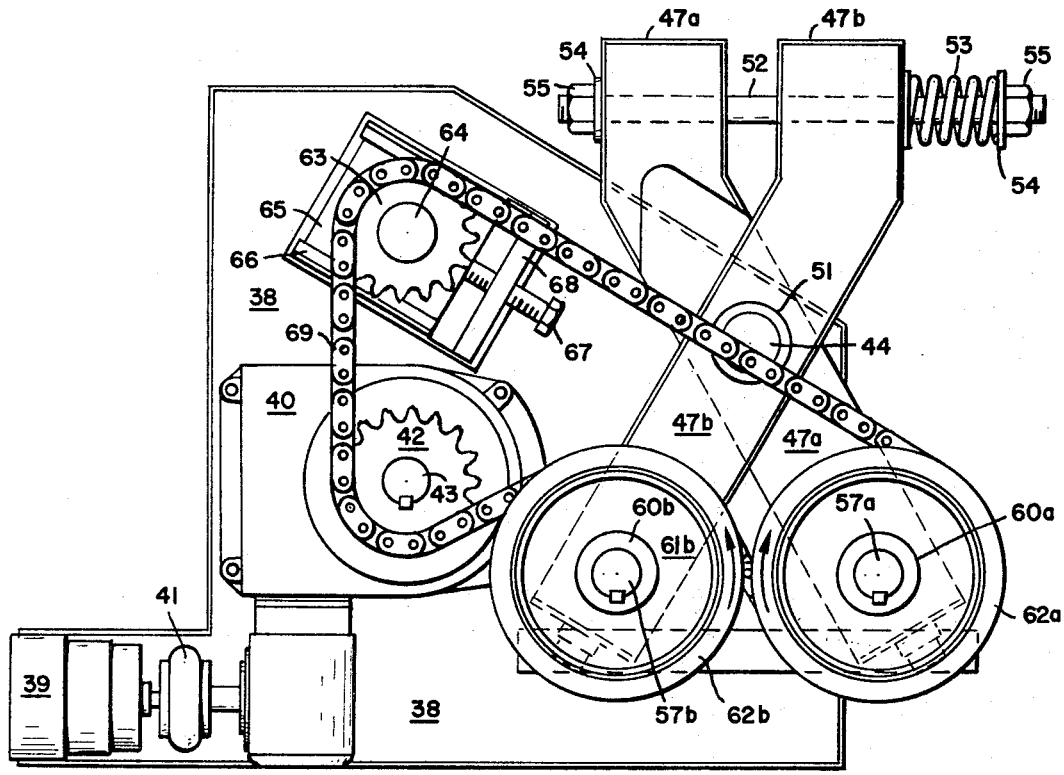
FIG_5
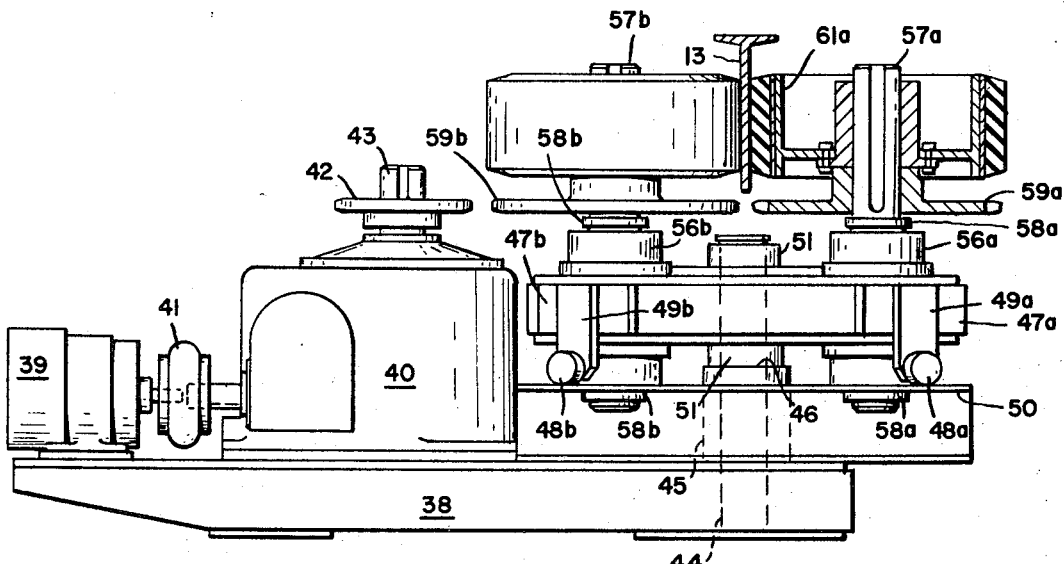
FIG_6
INVENTORS
HOUGHTON SAWYER, JR
BY GEORGE M. KOGAWARA
ATTORNEYS

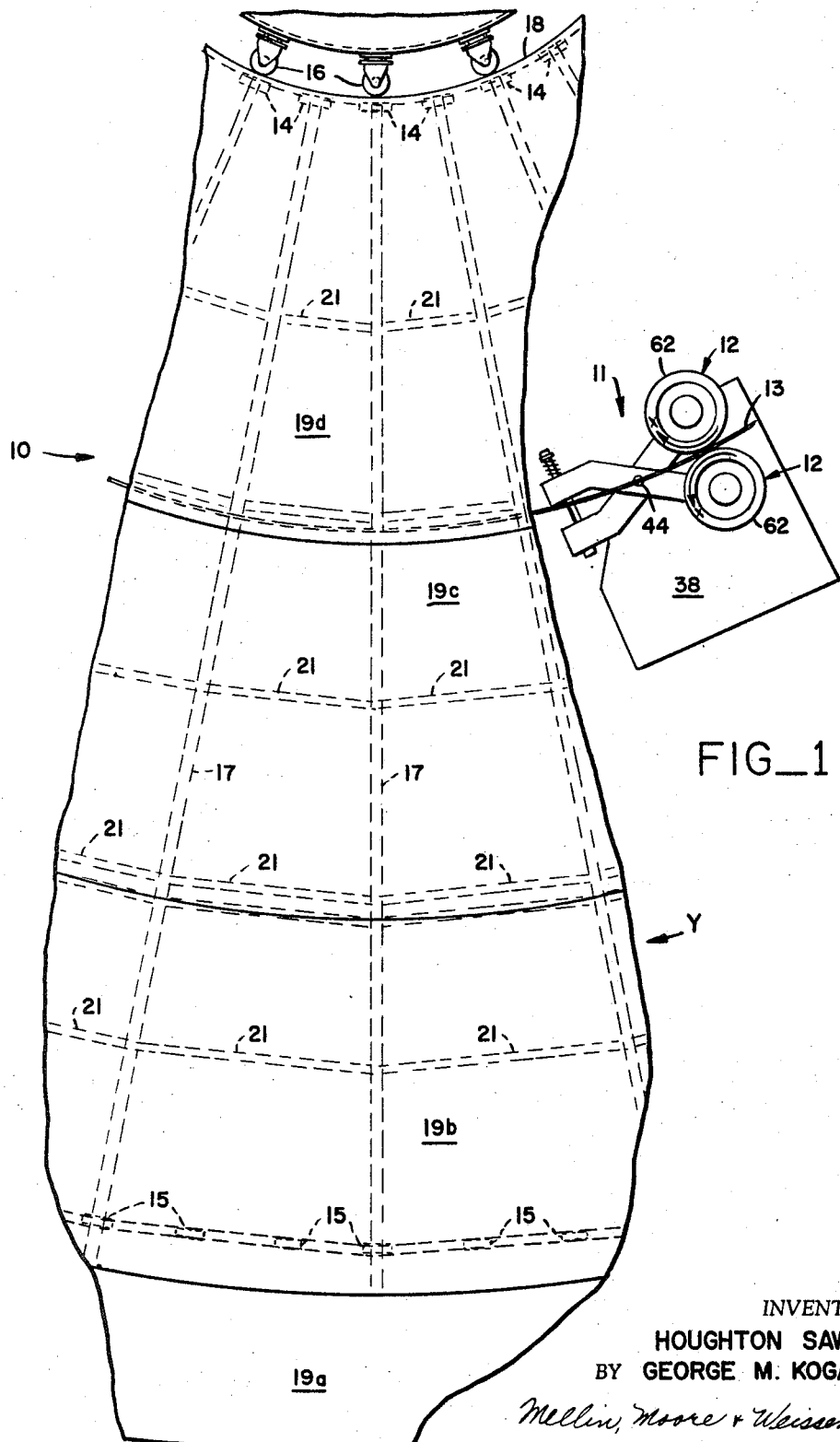

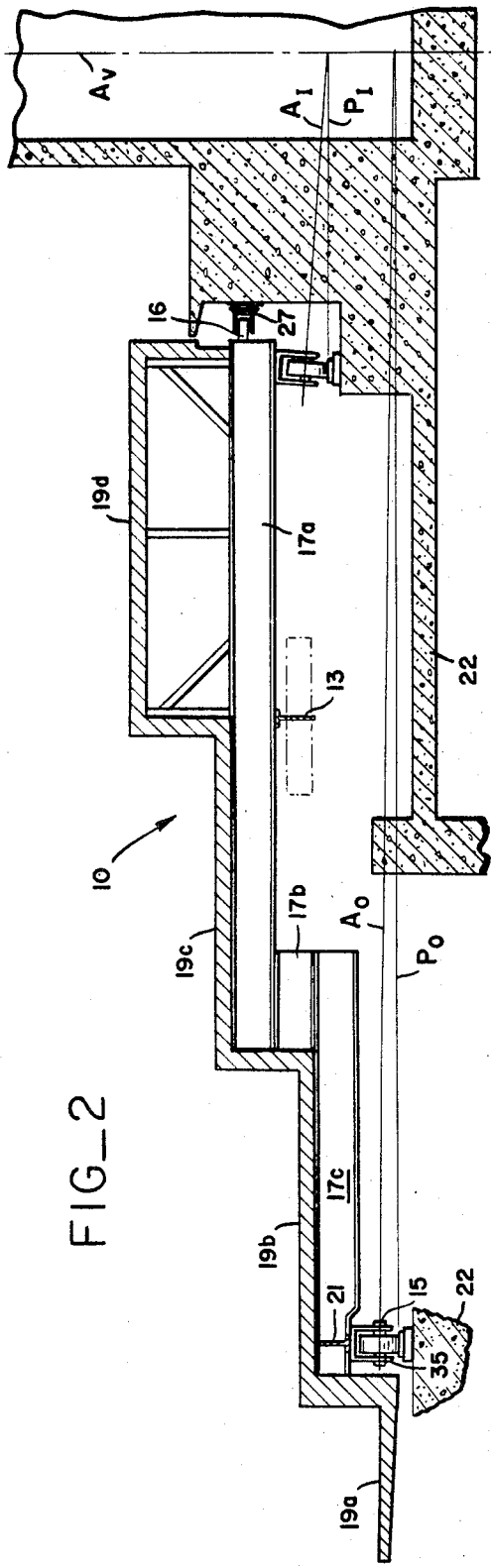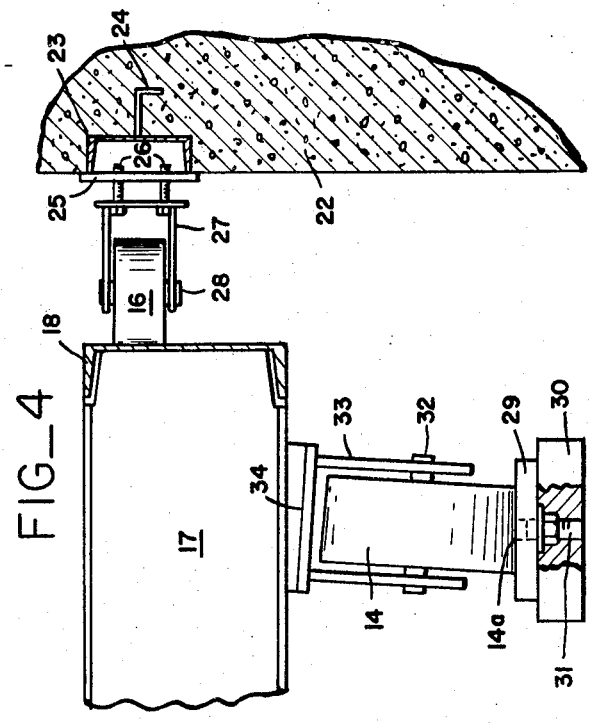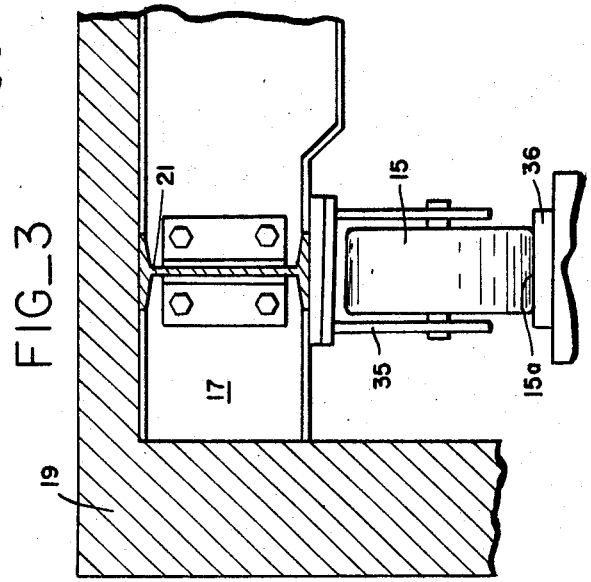

United States Patent Office 3,388,673
Patented June 18, 1968

3,388,673
ROTATABLE PLATFORM AND DRIVE
MECHANISM THEREFOR
Houghton Sawyer, Jr., 948 Spencer St. 96822, and
George M. Kogawara, 1601 Quincy Place 96816,
both of Honolulu, Hawaii
Filed Aug. 23, 1965, Ser. No. 481,743
15 Claims. (Cl. 104—36)

ABSTRACT OF THE DISCLOSURE

A rotatable platform which includes a horizontal member having a vertical cylindrical surface and being rotatable about the vertical axis of the cylindrical surface, a supporting surface under the horizontal member and defining a horizontal plane, means for engaging the cylindrical surface and fixing the intersection of the vertical axis with the horizontal plane of the supporting surface, a number of rollers secured about the circumference of the horizontally disposed member and adapted to engage with the supporting member and rotate about an axis which intersects the intersection of the vertical axis with the horizontal plane, and means for rotating the platform about the vertical axis.

---

This invention relates to a rotatable platform and a mechanism for rotating it. It is particularly adaptable to be embodied in a rotating restaurant floor although it is not limited thereto. The rotatable platform may be used in other contexts such as a turntable or merry-go-round, and the drive mechanism may be employed to impart motion to other bulky objects and, moreover, the motion imparted need not necessarily be circular, Regular movement of large bulky objects generally requires that special measures be taken to insure proper tracking and a constant velocity (that is, an absence of surging). If, in recurring movement of bulky objects, the object fails to track properly or constantly accelerates or decelerates (surges), excess wear occurs and the reliability and life of the assembly becomes intolerably short.

Prior to the present invention, means for insuring proper tracking and constant velocity have included bull gear and pinion drives, hydraulic cylinder and ratchet drives, and chain and sprocket drives. In each of the driving mechanisms considerable accuracy must be maintained between the driving and driven components. Accordingly, eccentricities in the driven component cannot be tolerated. The elimination of eccentricities requires highly accurate center layout and costly procedures to provide precisely circular driven components. Moreover, the drive mechanisms of the prior art, even when properly aligned with precisely circular driven components have generally produced surging and backlash due to the inability of the driving mechanism to dominate the inertia of the driven components.

Accordingly, it is an object of the present invention to provide an improved rotatable platform and means for rotating it at a constant velocity.

It is a further object to provide a rotatable platform and a means for rotating it which tolerates and compensates for eccentricities in the driven component of the platform.

It is a further object to provide a rotatable platform which does not deviate materially from its track without resort to complex center bearing members.

It is a further object to provide a driving means which imparts a constant slow velocity to bulky driven objects without surging.

It is a further object to provide a rotatable platform which does not deviate materially from its track and, driving means for rotating said platform at a constant slow velocity without surging which tolerates and compensates for eccentricities in the platform.

Each of the above objects is fulfilled in the specific embodiment which appears in the drawings wherein:

FIG. 1 is a fragmentary top view of the rotatable platform with a portion cut away to show the driving mechanism and its relationship to the platform;

FIG. 2 is a vertical sectional view taken on the line 2—2 of FIG. 1 and shows the rotatable platform, its caster mounting, and the relationship between the driven ring of the platform and the driving members of the drive mechanism;

FIG. 3 is an enlarged view of the outer caster shown in FIG. 2 and shows the caster mounting;

FIG. 4 is an enlarged view of the inner supporting caster and the centering caster, and includes some detail of the supporting track;

FIG. 5 is a top view of the drive mechanism;

FIG. 6 is an end view of the drive mechanism and shows one of the driving members in section and the relationship between the driving members of the mechanism and the driven ring of the platform.

The present invention comprises a rotatable platform mounted on casters which have an inclined axis of rotation passing through the intersection of the vertical axis of rotation of the platform and the horizontal plane defined by the caster supporting surface, and a drive mechanism for rotating it. It includes two species, namely, the rotatable platform and a drive mechanism including pivotable opposed driving members which tolerate and automatically compensate for eccentricities in the driven component. The driven component may include a platform, a merry-go-round, and other similar bulky, heavy objects.

The invention appears generally in FIG. 1. It includes a rotatable platform shown partially at 10 and a drive mechanism shown generally at 11. Rotation of driving members 12 in the direction of arrows X causes driven ring 13 to rotate. Platform 10 therefore rotates on inner caster ring 14 and outer caster ring 15 about the ring of centering casters 16 in the direction of arrow Y.

The platform is shown in FIGS. 1 and 2. It includes a series of radical I beams 17 which extend from the inner circular channel 18 to outer caster ring 15. In the embodiment shown platform 10 is provided with four tiers 19a–d. To provide for the tiers, radial I beam 17a is offset by means of I beam section 17b which is welded between radial I beam 17a and beam 17c. In addition vertical members 20a, 20b and 20c support the uppermost tier 19d. A series of stringers 21 is provided at varying distances from inner circular channel 18. Stringers 21 extend from one radial I beam 17 to the adjacent radial I beam and are preferably joined therewith as shown in FIG. 3.

The upper surface 19 of the platform is preferably formed by a layer of concrete placed on a corrugated metal sheet secured to radial I beam 17 and stringers 21 and, in the case of upper tier 19d, vertical members 20a–c.

Inner circular channel 18 provides a vertical cylindrical surface for engagement with centering casters 16 as the platform is rotated about the vertical axis, $A_V$, shown in FIG. 2.

Centering casters 16 are mounted to the outer cylindrical surface of concrete centerpost 22. A circular channel 23 is imbedded in concrete centerpost 22 and anchored thereto by means of anchors 24. A series of plates 25 is welded to channel 23 and mounting studs 26 are secured thereto. Centering caster bracket 27 is bolted to mounting studs 26 and centering caster 16 is therefore mounted for rotation about the vertical axis of pin 28. In the embodiment shown, where the radius of centerpost 22 is about six and one-half feet, sixteen centering casters are provided.

Inner caster ring 14 is mounted for tracking on track 29 which is best seen in FIG. 4. Track 29 is circular and is concentric with the circle defined by centering casters 16. It is embedded in grout material 30 and secured thereto by welding to anchor 31 which is embedded in concrete centerpost 22.

Inner casters 14 rotate about pin 32 of inner caster bracket 33 which is welded to the bottom of radial I beam 17 with an inclined axis of rotation provided by means of block 34 which is trapezoidal in cross section. The relationship between the inclined axis of rotation, $A_i$, of inner caster 14, the vertical axis of rotation, $A_v$, of rotating platform 10, and the horizontal plane, $P_i$, defined by the inner track 29 is critical. The axis of rotation, $A_i$, of inner casters 14 intersects the vertical axis, $A_v$, at the point of intersection between axis, $A_v$, and the horizontal plan, $P_i$, defined by the upper supporting surface of track 29. The outer bearing surface 14a of caster 14 is beveled so that it lies in the plane, $P_i$.

Outer caster ring 15 is similarly mounted. Outer caster mounting bracket 35 is mounted to radial I beam 17 so that the axis of rotation, $A_o$, of outer caster 15 intersects the vertical axis of rotation, $A_v$, at the intersection between axis, $A_v$, and the horizontal plane, $P_o$, defined by the upper supporting surface of outer track 36. Outer caster 15 is beveled, like casters 14, so that its bearing surface 15a is uniformly in contact with the upper surface of outer track 36.

In the embodiment shown, the radius of inner caster ring 14 is eight feet and axis, $A_i$, is inclined at an angle of three degrees and thirty minutes. Thirty-two inner casters are equally spaced circumferentially on the eight foot radius.

The radius of outer caster ring 15 is thirty feet six inches.

Eighty-eight outer casters are provided and inclined at an angle of zero degrees, fifty-eight minutes and five seconds.

Driven ring 13 is welded beneath radial beam 17a as best seen in FIG. 2. It is circular and mounted concentrically with outer caster ring 15 and inner caster ring 14. It provides a vertical cylindrical bearing surface for engagement with the drive mechanism described below.

The drive mechanism appears in FIGS. 5 and 6. It includes a base 38, motor 39 and gear reducer 40. Coupling 41 connects the output shaft of motor 39 with the input shaft of gear reducer 40. Sprocket 42 is keyed to output shaft 43 and accordingly rotates therewith. A vertical pin 44 extends vertically from base 38 in sleeve 45 and through shoulder 46. Rigid arms 47a and 47b are pivotally mounted to pin 44. Arms 47a and 47b are pivotable with respect to base 38 and with respect to each other about the axis of pin 44. Rollers 48a and 48b are provided on vertical plate 49a and 49b respectively and pivot with arms 47a and 47b respectively. A horizontal plate 50 fixed to base 38 provides a bearing surface over which rollers 48 travel. Arms 47a and 47b are mounted to pin 44 by bearings 51 which rest on shoulder 46. Accordingly shoulder 46 and rollers 48 support arms 47a and 47b in a horizontal plane.

Rod 52 and heavy compression spring 53 are provided in association with washers 54 and nuts 55 so that spring 53 constantly urges opposing ends of arms 47a and 47b together.

Bearings 56a and 56b are provided on the opposing ends of arms 47 opposite rod 52. Shafts 57a and 57b are rotatably mounted in hearings 56a and 56b respectively and retained in position by locking rings 58a and 58b. Sprockets 59a and 59b are keyed to shafts 57a and 57b respectively. Hubs 60a and 60b are also keyed to shafts 57a and 57b respectively. Rims 61a and 61b extend from hubs 60a and 60b and provide a cylindrical mounting surface for rubber tires 62a and 62b.

An adjusting sprocket 63 is mounted on shaft 64 secured to block 65. Block 65 is slidable in retainer 66. Adjusting nut 67 is threaded into wall 68 which is fixed to base 38 along with retainer 66. The position of sprocket 63 is therefore adjustable in the direction of the axis of bolt 67 to vary the tension in chain 69.

Roller chain 69 extends around drive sprocket 42, sprocket 59b, sprocket 59a, and adjusting sprocket 63. Thus rotation of drive sprocket 42 causes a rotation of sprocket 59a and 59b in the direction of arrow X in FIG. 5.

A two H.P. G.E. Frame 184 1800 r.p.m. 22/440 three-phase v. AC 60 cycle motor in combination with a double reduction 62 r.p.m. output speed, 40.1 primary, 70.1 secondary, output torque of 59,620 inch pounds speed reducer is satisfactory for rotation of the platform shown. Both the power supply and gear reducer may vary considerably with variations in platform size and desired speed of rotation, etc.

The relationship between drive mechanism 11 and rotatable platform 10 is best seen in FIGS. 1 and 2. Drive mechanism 11 is positioned beneath rotatable platform 10 with driven ring 13 between opposed driving tires 62, and with the vertical axis of pin 44 a distance from the vertical axis of rotation, $A_v$, equal to the radius of driven ring 13 (see FIG. 1 and FIG. 6). Thus the vertical axis of pin 44 passes through driving ring 13.

In operation, motor 39 causes driving sprocket 42 to rotate at a reduced speed due to the presence of gear reducer 40. Driving sprocket 42 actuates roller chain 69 which causes rotation of opposed sprockets 59 in opposite directions due to the path of chain 69. Sprockets 59 cause tires 62 to rotate in opposite directions as shown by arrow X in FIG. 1. Tires 62, in engagement with driven ring 13, cause it to rotate and consequently platform 10 rotates.

Any eccentricities in driven ring 13 are tolerated and automatically compensated for by drive mechanism 11. Driving tires 62, constantly in engagement with ring 13, merely "track" the eccentricity by pivoting about the axis of pin 44. Since pin 44 is positioned a distance from the axis, $A_v$, equal to the design radius of driven ring 13, the extent of the pivoting is minimized. Moreover, the position of pin 44 with respect to driven ring 13, insures that the force on driven ring 13 by driving tires 62 is as purely tangential as possible.

In the event that it may be desirable to eliminate chain 69, the drive mechanism may include but one driving member (as opposed to two) by replacing the rubber tire 62a with a spur gear and providing driven ring 13 with gear teeth on its inner surface to accommodate the spur gear. Motor 39 and an appropriate reducing means could then be mounted directly to arm 47a. Thus driven ring 13 and consequently platform 10 may be caused to rotate with but one driving member. The opposed member would then idle and cause the spur gear to track the accommodating gear teeth on driven ring 13.

Where the drive mechanism shown is employed to impart motion to bulky objects other than rotating platforms, pin 44 must be positioned so that its vertical axis passes through the driven component engaged by driving members 12.

Although driving mechanism 11 is designed to impart motion in a direction from driving members 12 to pin 44, the direction of motion may be reversed by reversing the direction of rotation of driving members 12 without departing from the scope of the present invention. Moreover, the direction of rotation of platform 10 may be reversed by rotating the drive mechanism 11, 180° from the position shown in FIG. 1.

Having thus described our invention, we claim:

1. A rotatable platform which comprises:
   (a) a horizontally disposed member having a vertical cylindrical surface, the axis of said cylindrical surface defining a vertical axis of rotation of said member;
(b) a supporting surface defining a horizontal plane beneath said member;
(c) means for engaging said cylindrical surface and fixing the intersection of said vertical axis with said horizontal plane;
(d) a series of circumferentially spaced roller means rotatably secured to said member for engagement with said supporting surface and rotation about an axis intersecting said vertical axis at said intersection of said vertical axis with said horizontal plane; and
(e) means for engaging and rotating said platform about said vertical axis of rotation.

2. A rotatable platform which comprises:
(a) a horizontally disposed member having a vertical cylindrical surface, the axis of said cylindrical surface defining a vertical axis of rotation of said member;
(b) a supporting surface defining a horizontal plane beneath said member;
(c) means for engaging said cylindrical surface and fixing the intersection of said vertical axis with said horizontal plane;
(d) an inner and outer ring of circumferentially spaced roller means rotatably secured to said member for engagement with said supporting surface and rotation about an axis intersecting said vertical axis at said intersection of said vertical axis with said horizontal plane, said inner ring and said outer ring being concentric with said vertical cylindrical surface and spaced outwardly therefrom, and
(e) means for engaging and rotating said platform about said vertical axis of rotation.

3. A rotatable platform which comprises:
(a) a horizontally disposed member having a vertical cylindrical surface, the axis of said cylindrical surface defining a vertical axis of rotation of said member;
(b) a supporting surface defining a horizontal plane beneath said member;
(c) means for engaging said cylindrical surface and fixing the intersection of said vertical axis with said horizontal plane; and
(d) a series of circumferentially spaced roller means rotatably secured to said member for engagement with said supporting surface and rotation about an axis intersecting said vertical axis at said intersection of said vertical axis with said horizontal plane.

4. The rotatable platform of claim 3 and a cylindrical ring secured to said horizontally disposed member concentrically with said vertical cylindrical surface of said member.

5. The rotatable platform of claim 4 and means for engaging and rotating said ring about said vertical axis of rotation.

6. The rotatable platform of claim 5 wherein said means for engaging and rotating said ring comprises:
(a) a pair of rigid intersecting arms defining a plane and means mounting said arms for independent pivotal movement in said plane about a common axis perpendicular to said plane;
(b) means pivotable about said common axis with said arms for biasing said arms together;
(c) a pair of opposed driving members rotatably mounted to said arms respectively for rotation about an axis perpendicular to said plane; and
(d) means for rotating at least one of said members throughout said pivoting and said biasing;
(e) said common axis being horizontally disposed a distance from said vertical axis of rotation equal to the radius of said ring and said opposed driving members being respectively engaged with opposite sides of said ring.

7. The rotatable platform of claim 5 wherein said means for engaging and rotating said ring comprises:
(a) a pair of rigid intersecting arms defining a plane and means mounting said arms for independent pivotal movement in said plane about a common axis perpendicular to said plane;
(b) means pivotable about said common axis with said arms for biasing said arms together;
(c) a pair of opposed driving members rotatably mounted to said arms respectively for rotation about an axis perpendicular to said plane; and
(d) means for synchronously rotating said driving members at the same rate in opposite directions throughout said pivoting and said biasing;
(e) said common axis being horizontally disposed a distance from said vertical axis of rotation equal to the radius of said ring and said opposed driving members being respectively engaged with opposite sides of said ring.

8. The drive mechanism of claim 7 wherein said means for synchronously rotating said driving members comprises:
(a) a pair of opposed sprockets rotatably mounted to said arms respectively and rotationally fixed to said driving members respectively for coaxial rotation therewith;
(b) a drive sprocket mounted for rotation about an axis perpendicular to said plane defined by said intersecting arms, in the plane defined by said opposed sprockets;
(c) an endless chain extending partially around said drive sprocket, one of said opposed sprockets, and, in the opposite direction, around the other of said opposed sprockets; and
(d) means for rotating said drive sprocket.

9. A rotatable platform which comprises:
(a) a horizontally disposed member having a vertical cylindrical surface, the axis of said cylindrical surface defining a vertical axis of rotation of said member;
(b) a supporting surface defining a horizontal plane beneath said member;
(c) means for engaging said cylindrical surface and fixing the intersection of said vertical axis with said horizontal plane; and
(d) an inner and outer ring of circumferentially spaced roller means rotatably secured to said member for engagement with said support surface and rotation about an axis intersecting said vertical axis at said intersection of said vertical axis with said horizontal plane, said inner ring and said outer ring being concentric with said vertical cylindrical surface and spaced outwardly therefrom.

10. The rotatable platform of claim 9 and a cylindrical ring secured to said horizontally disposed member concentric with said vertical cylindrical surface of said member between said inner ring and said outer ring.

11. The rotatable platform of claim 10 and means for engaging and rotating said ring about said vertical axis of rotation.

12. The rotatable platform of claim 11 wherein said means for engaging and rotating said ring comprises:
(a) a pair of rigid intersecting arms defining a plane and means mounting said arms for independent pivotal movement in said plane about a common axis perpendicular to said plane;
(b) means pivotable about said common axis with said arms for biasing said arms together;
(c) a pair of opposed driving members rotatably mounted to said arms respectively for rotation about an axis perpendicular to said plane; and
(d) means for rotating at least one of said members throughout said pivoting and said biasing;
(e) said common axis being horizontally disposed a distance from said vertical axis of rotation equal to the radius of said ring and said opposed driving members being respectively engaged with opposite sides of said ring.

13. The rotatable platform of claim 11 wherein said means for engaging and rotating said ring comprises:
   (a) a pair of rigid intersecting arms defining a plane and means mounting said arms for independent pivotal movement in said plane about a common axis perpendicular to said plane;
   (b) means pivotable about said common axis with said arms for biasing said arms together;
   (c) a pair of opposed driving members rotatably mounted to said arms respectively for rotation about an axis perpendicular to said plane; and
   (d) means for synchronously rotating said driving members at the same rate in opposite directions throughout said pivoting and said biasing;
   (e) said common axis being horizontally disposed a distance from said vertical axis of rotation equal to the radius of said ring and said opposed driving members being respectively engaged with opposite sides of said ring.

14. The rotatable platform of claim 13 wherein said means for synchronously rotating said driving members comprises:
   (a) a pair of opposed sprockets rotatably mounted to said arms respectively and rotationally fixed to said driving members respectively for coaxial rotation therewith;
   (b) a drive sprocket mounted for rotation about an axis perpendicular to said plane defined by said intersecting arms, in the plane defined by said opposed sprockets;
   (c) an endless chain extending partially around said drive sprocket, one of said opposed sprockets, and, in the opposite direction, around the other of said opposed sprockets; and
   (d) means for rotating said drive sprocket.

15. A drive mechanism which comprises:
   (a) a pair of rigid intersecting arms defining a plane and means mounting said arms for independent pivotal movement in said plane about a common axis perpendicular to said plane;
   (b) means pivotable about said common axis with said arms for biasing said arms together;
   (c) a pair of opposed driving members rotatably mounted to said arms respectively for rotation about an axis perpendicular to said plane; and
   (d) means for synchronously rotating said driving members at the same rate in opposite directions throughout said pivoting and said biasing comprising a pair of opposed sprockets rotatably mounted to said arms respectively and rotationally fixed to said driving members respectively for coaxial rotation therewith, a drive sprocket mounted for rotation about an axis perpendicular to said plane defined by said intersecting arms, in the plane defined by said opposed sprockets, an endless chain extending partially around said drive sprocket, one of said opposed sprockets, and, in the opposite direction, around the other of said opposed sprockets, and means for rotating said drive sprocket.

References Cited
UNITED STATES PATENTS

| | | | |
|---|---|---|---|
| 507,887 | 10/1893 | Dean | 104—217 |
| 1,689,160 | 10/1928 | Siegrist | 108—139 |
| 2,044,031 | 6/1936 | Van Nieuwland | 104—35 |
| 2,617,365 | 11/1952 | Martin | 105—135 |
| 3,142,269 | 7/1964 | Keck | 108—103 |

ARTHUR L. LA POINT, *Primary Examiner.*

D. F. WORTH, *Assistant Examiner.*

UNITED STATES PATENT OFFICE
CERTIFICATE OF CORRECTION

Patent No. 3,388,673　　　　　　　　　　　　June 18, 1968

Houghton Sawyer, Jr., et al.

It is certified that error appears in the above identified patent and that said Letters Patent are hereby corrected as shown below:

Column 2, line 45, "radical I" should read -- radical eye --.
Column 4, line 16, "62 r.p.m." should read -- .62 r.p.m. --.

Signed and sealed this 13th day of January 1970.

(SEAL)
Attest:

Edward M. Fletcher, Jr.　　　　　　　　WILLIAM E. SCHUYLER, JR.
Attesting Officer　　　　　　　　　　　　Commissioner of Patents